United States Patent
Rozzi (10) Patent No.: US 6,232,954 B1
(45) Date of Patent: May 15, 2001

(54) ARRANGEMENT FOR HIGH-ACCURACY COLORIMETRIC CHARACTERIZATION OF DISPLAY DEVICES AND METHOD THEREFOR

(75) Inventor: William A. Rozzi, West Lakeland Township, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 08/855,709

(22) Filed: May 8, 1997

(51) Int. Cl.$^7$ .................................................. G09G 5/02

(52) U.S. Cl. ................................................ 345/150; 358/518

(58) Field of Search ................................... 345/150, 153, 345/199, 431; 358/518; 702/85

(56) References Cited

U.S. PATENT DOCUMENTS

| | | | |
|---|---|---|---|
| 4,393,398 | | 7/1983 | Horiguchi et al. ............... 358/527 |
| 4,500,919 | | 2/1985 | Schreiber ........................ 358/518 |
| 5,053,866 | * | 10/1991 | Johnson ........................... 358/304 |
| 5,339,176 | | 8/1994 | Smilansky et al. ............... 358/504 |
| 5,428,720 | * | 6/1995 | Adams, Jr. ........................ 345/431 |
| 5,526,140 | | 6/1996 | Rozzi .............................. 358/535 |
| 5,543,940 | * | 8/1996 | Sherman ......................... 358/518 |
| 5,583,666 | * | 12/1996 | Ellson et al. ................... 358/518 |
| 5,612,902 | * | 3/1997 | Stokes ............................. 702/85 |
| 5,754,184 | * | 5/1998 | Ring et al. ...................... 345/431 |
| 5,781,206 | * | 7/1998 | Edge .............................. 347/19 |
| 5,963,263 | * | 10/1999 | Shyu .............................. 348/453 |

FOREIGN PATENT DOCUMENTS

| | | |
|---|---|---|
| 539868 | 5/1993 | (EP) . |
| 684728 | 11/1995 | (EP) . |
| WO9102427 | 2/1991 | (WO) . |
| WO9608916 | 3/1996 | (WO) . |

OTHER PUBLICATIONS

E. Allen, "Colorant Formulation and Shading", *Optical Radiation Measurements*, vol. 2, Color Measurement, F. Grum and C.J. Bartelson, Eds., Academic Press, New York, 1980.

R.S. Berns, "Spectral modeling of a dye diffusion thermal transfer printer", *Journal of Electronic Imaging*, vol. 2, No. 4, Oct. 1993, pp. 359–370.

R.S. Berns et al., "CRT Colorimetry. Part I: Theory and Practice," *Color Research and Application*, vol. 18, No. 5, Oct. 1993, pp. 299–314.

R.S. Berns et al., "CRT Colorimetry. Part II: Metrology," *Color Research and Application*, vol. 18, No. 5, Oct. 1993, pp. 315–325.

G.T. Hagan, "Resampling Methods for Image Manipulation," *The C Users Journal*, Aug. 1991, vol. 9, No. 8, pp. 53–58.

H.R. Kang, "Color Scanner Calibration," *Journal of Imaging Science and Technology*, vol. 36, No. 2, Mar./Apr. 1992, pp. 162–170.

F. Sigg, "Errors in Measuring Halftone Dot Areas," *Journal of Applied Photographic Engineering*, vol. 9, No. 1, Feb. 1983, pp. 27–32.

(List continued on next page.)

*Primary Examiner*—Steven Saras
*Assistant Examiner*—Fritz Alphonse
(74) *Attorney, Agent, or Firm*—William D. Bauer (57) ABSTRACT

Arrangements and methods characterize the calorimetric response of a display device. These arrangements and methods use an analytic model selected based on the type of the display device to characterize the calorimetric response of the display device. A lookup table compensates for individual characteristics of the particular display device by receiving a set of indices and providing a set of adjusted values as inputs to the analytic model.

38 Claims, 5 Drawing Sheets

OTHER PUBLICATIONS

M. Stokes et al., "Colorimetrically Quantified Visual Tolerances For Pictoral Images," *Proceedings 1992, Technical Association of the Graphics Arts and Inter–Society Color Council*, Papers presented at the Conference on "Comparison of Color Images Presented in Different Media", Williamsburg, Virginia, Feb. 23–26, 1992, vol. 2, pp. 757–777.

J.A. Viggiano, "Modeling the Color of Multi–Colored Halftones," Proc. TAGA 1990, pp. 44–62.

R. W. Hamming, Numerical Methods for Scientists and Engineers, $2^{nd}$ Ed., Dover, New York, 1973, pp. 673–675.

W.H. Press et al., *Numerical Recipes in C*, Second Edition, Cambridge University Press, New York, 1992, pp. 412–420.

www.altrona Website, "Details: Gain and Offset Control" and "Details: Gamma Correction" DVC Company, Jun. 1995.

* cited by examiner

ARRANGEMENT FOR HIGH-ACCURACY COLORIMETRIC CHARACTERIZATION OF DISPLAY DEVICES AND METHOD THEREFOR

FIELD OF THE INVENTION

The present invention relates generally to the practice of color reproduction. More particularly, the present invention relates to the practice of characterizing display devices.

BACKGROUND OF THE INVENTION

Color reproduction processes typically involve duplicating a color image from one medium to another medium, e.g., from one printed copy to another or from a display screen to a printed copy. Processes of this type are used in various application environments, including, for example, color proofing applications. In color reproduction processes, it is desirable to produce a duplicate whose coloration is highly similar to that of the original.

Accurate color rendering has been difficult to achieve, however. Display devices, such as printers, dye diffusion devices, slide printers, CRTs, and other electronic-type displays, have color rendering characteristics that are generally difficult to identify or difficult to model analytically, even after identification.

These characteristics are particular to classes or types of color display devices, as well as to each individual display device within a class. One such class, referred to as multi-color halftone printing devices, for example, produces a range of colors by using arrays of dots of a small number of colorants, or inks. Many printers of this type use what is known as a CMYK colorant scheme, which includes four color separations and four corresponding inks: cyan, magenta, yellow, and black.

Halftone printing devices use arrays of dots to simulate lighter tints as well as mixes of colors. In a typical multi-color, halftone printing technique, an original image is scanned through color filters to form a set of continuous-tone color separations. Each of the color separations represents intensities of one of the separated colors, such as yellow, at a plurality of pixel locations within the original image. The continuous-tone color separations are processed using a halftone screening system to produce a set of halftone color separations in the form of bitmaps. Each of the color separation bitmaps represents the bi-level condition of one of the separated colors at an addressable unit of the medium. For example, a typical four-color printing process uses four bitmaps, with each addressable unit of the medium having four associated bi-level conditions. The addressability of the color separation bitmaps ordinarily is much higher than the addressability of the continuous-tone color separations because several bi-level, addressable units are used to represent the intensity at a single continuous-tone pixel location.

In some applications, color separation bitmaps of this type are used to form halftone printing plates or to control a halftone printing mechanism such as a thermal mass-transfer device. In either case, the addressable units defined by the color separation bitmaps are imaged on a printing substrate by formation of dots carrying colorants that correspond to the separated colors. The dots are typically sized somewhat larger than the addressable units in order to provide a degree of partial overlap that prevents the appearance of gaps between adjacent dots in areas of solid color.

As addressed above, each halftone printer exhibits individual characteristics. These characteristics depend on, for example, the particular inks and paper used. Furthermore, the colorant channels in each individual halftone printer interact in a manner particular to the individual printer.

Several mathematical models have been proposed to characterize multi-color halftone printers. Many of these models are essentially analytic. For example, one model uses simple one-dimensional transfer functions to linearize CMYK values with respect to dot areas. Such analytic models typically use a relatively small number of parameters to model the behavior of devices and are primarily implemented using mathematical equations. Analytic models of this type, for many color reproduction applications, fail to consider sufficiently the individual printer characteristics discussed above.

Another class of color display devices, referred to as dye diffusion devices, uses a print head to produce color images. A dye-impregnated ribbon is typically laid over the sheet of paper on which the color image is to be printed. The print head impregnates the sheet with a certain concentration of the dyes contained in the ribbon. After the first color is printed, another ribbon impregnated with a dye of a different color is laid over the sheet. This process is typically repeated until all the colors have been printed. In a typical four-dye diffusion process, CMYK dyes are used.

Dye diffusion devices, like halftone printing devices, are also affected by various phenomena. For instance, a phenomenon known as dye inhibition occurs because subsequent dyes diffuse into the sheet of paper with more difficulty than initial dyes. If the cyan dye is diffused after the yellow dye, for example, the paper absorbs the cyan dye less readily than the yellow dye. Another phenomenon exhibited by typical dye diffusion processes is known as back transfer. Some of the dye diffused to the paper diffuses back into the ribbon. Each individual dye diffusion device exhibits individual characteristics that depend on, for example, the ribbon and paper used. These phenomena give rise to channel interactions that are difficult to model analytically due to their complexity.

Some types of analytical models proposed for characterizing dye diffusion printing processes use multiple-linear regression of channel-independent concentration estimates to correct for channel interactions. Such approaches, however, rely too heavily on regression equations. Due to the difficulty of accurately characterizing channel interactions using regression equations, these approaches often produce unacceptably large maximum color errors. Moreover, it is difficult to control the accuracy of these approaches at certain critical locations in color space, such as the primaries, secondaries, and neutrals.

Still another class of color display devices, known as cathode ray tubes (CRTs), produces colors by using an electron beam to illuminate phosphors of a small number of primary colors at pixels on a display screen. Most CRTs follow an RGB scheme, which uses red, green, and blue phosphors. When the electron beam illuminates closely-spaced phosphors, color blending creates the appearance of the color formed by combining the primary colors. For example, illuminating proximate red and green phosphors results in varying shades of yellow, depending on the intensity with which each phosphor is illuminated.

Several analytic models have been proposed for characterizing CRTs. Such models often use a gain-offset-gamma equation for each channel and a matrix for converting device-dependent (e.g., RGB) to device-independent color coordinates, such as Commission Internationale de L' Éclairage (CIE) XYZ tristimulus values. Models of this type yield reasonably accurate calorimetric characterizations for high quality CRTs that exhibit a high degree of independence between color channels. Like other types of display devices, however, CRTs typically exhibit channel interactions that are not adequately considered in these analytic models. Regression models have been proposed to account for these channel interactions. As with channel interactions affecting dye diffusion devices, however, these channel interactions are difficult to characterize using regression models. As a result, using regression models to account for channel interactions often results in undesirable and sometimes unacceptable maximum errors. In addition, some lower-quality CRTs exhibit other idiosyncrasies, such as changes in channel chromaticity with variations in digital color values. Behavioral characteristics of this type cause the response of such lower-quality CRTs to deviate from analytic models.

SUMMARY OF THE INVENTION

The present invention is directed to systems and methods for characterizing the colorimetric response of a display device. According to one embodiment of the present invention, a system constructs a display device model that characterizes such a display device. The system includes a color measuring instrument configured and arranged to obtain color values from color patches. A computer arrangement is configured and arranged to construct the display device model as a function of the color values. The display device model has an analytic model constructed as a function of a type of the display device. A lookup table comprising a set of entries is constructed and arranged to compensate for certain colorimetric characteristics of the display device by receiving a set of indices and providing a set of adjusted values as inputs to the analytic model.

A method embodiment of the present invention is directed to a method for constructing a display device model that characterizes the calorimetric response of a display device. The method includes obtaining color values from a set of color patches. An analytic model is constructed as a function of the color values and a type of the display device. A lookup table that comprises a set of entries is constructed as a function of the color values. The lookup table is constructed and arranged to compensate for certain calorimetric characteristics of the display device by receiving a set of indices and providing a set of adjusted values as inputs to the analytic model. Additional embodiments of the present invention are directed to a system, a computer arrangement, and a data storage medium for use in characterizing a display device.

Another aspect of the present invention is directed to a method for predicting a color from a plurality of inputs. The method includes presenting the inputs to a lookup table comprising a set of entries. From the lookup table, an entry is retrieved as a function of the inputs. The retrieved entry is provided to an analytic model. The analytic model is used to predict the color as a function of the retrieved entry.

BRIEF DESCRIPTION OF THE DRAWINGS

Other aspects and advantages of the present invention will become apparent upon reading the following detailed description and upon reference to the drawings in which.

While the present invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention is believed to be applicable to a variety of color reproduction and display devices. The present invention has been found to be particularly advantageous for use in color reproduction using halftone printers, dye diffusion devices, and CRTs. While the present invention is not so limited, an appreciation of the invention is best gained through a discussion of these particular application examples.

According to one aspect of the present invention, a modeling technique may be applied to a variety of color reproduction processes. Each type of color reproduction process exhibits particular behavioral characteristics that decrease the accuracy of conventional modeling techniques. For example, halftone printers, dye diffusion devices, and CRTs are affected by interactions between the colorant channels. The present invention is directed to calorimetric characterization of a variety of display devices using models that consider interactions between colorant channels more fully than conventional techniques. As a result, the accuracy of the characterization is improved.

One specific embodiment of the present invention incorporates a lookup table that compensates for these behavioral characteristics and provides more accurate calorimetric characterizations of display devices. This technique may be viewed as including two stages. In the first stage, a modeling system characterizes a display device by generating a mapping of color coordinates in a device-dependent color space to color coordinates in a device-independent color space. In the second stage, the modeling system uses the device characterization generated in the first stage to predict the device-independent color or spectrum represented by a set of digital values. For instance, assuming the modeling system models a halftone printer, the device characterization can be used to build a mapping of digital CMYK values to values in a device-independent color space, such as the CIE $L^*a^*b^*$ coordinate system. In this coordinate system, the $L^*$ dimension corresponds to lightness, the $a^*$ dimension corresponds to redness-greenness, and the $b^*$ dimension corresponds to yellowness-blueness.

Figure 1:
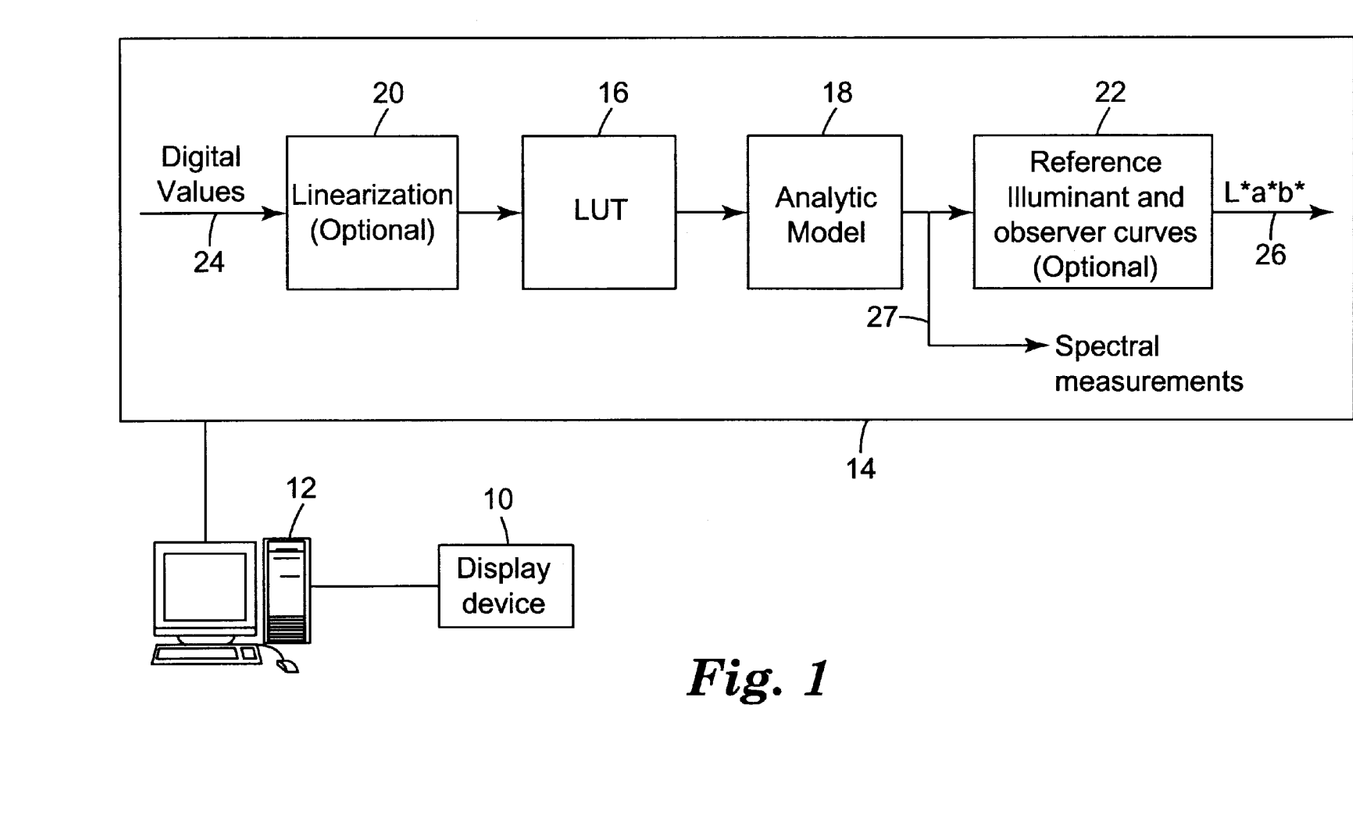
FIG. 1 illustrates a system for characterizing a display device according to one aspect of the present invention.

Referring now to the drawings, FIG. 1 illustrates an example system according to the present invention configured to model a display device 10. A computer arrangement 12, appropriately programmed, is connected to the display device 10. The computer arrangement 12 may be implemented, for example, using a conventional personal computer (such as an Apple- or IBM-compatible computer) and CD-ROM based software or using another computer-based design.

Using, for example, spectral measurements obtained from the display device 10, the computer arrangement 12 develops a calorimetric model 14 of the display device 10. It should be understood that the computer arrangement 12 can develop the calorimetric model 14 using other device-independent data, such as XYZ tristimulus values. The calorimetric model 14 maps color values specific to the display device 10 to device-independent color values. For example, assuming the display device 10 is implemented as a halftone printer or a dye diffusion device employing a CMYK colorant scheme, the calorimetric model 14 maps CMYK values presented at an input 24 to a device-independent color space, such as the $L^*a^*b^*$ color space. The calorimetric model 14 then provides the device-independent color values thus generated at an output 26. In addition, the spectral measurements are optionally provided at an output 27. To compensate for the individual behaviors of each display device, the model 14 incorporates one or more lookup tables (LUTs) 16 in addition to an analytic model 18. The analytic model 18 is implemented mathematically, e.g., using the computer arrangement 12 or, as an alternate embodiment, the analytic model is implemented in multiple parts, e.g., using less precise (or less computationally-intense) mathematical equations followed by a value-correcting LUT or LUTs.

The LUT 16 may be implemented using a volatile or nonvolatile memory, such as a data file on a hard disk. Alternatively, instead of storing the LUT 16, the computer arrangement 12 may store the raw data, e.g., spectral measurements, used in generating the model 14. The model 14 optionally also includes a linearization 20 for generating indices for indexing the LUT 16 and a set of reference illuminant and observer curves 22 for converting spectral coordinates to tristimulus values, such as XYZ values, or to another device-independent color space, such as the $L^*a^*b^*$ color space.

Figure 2:
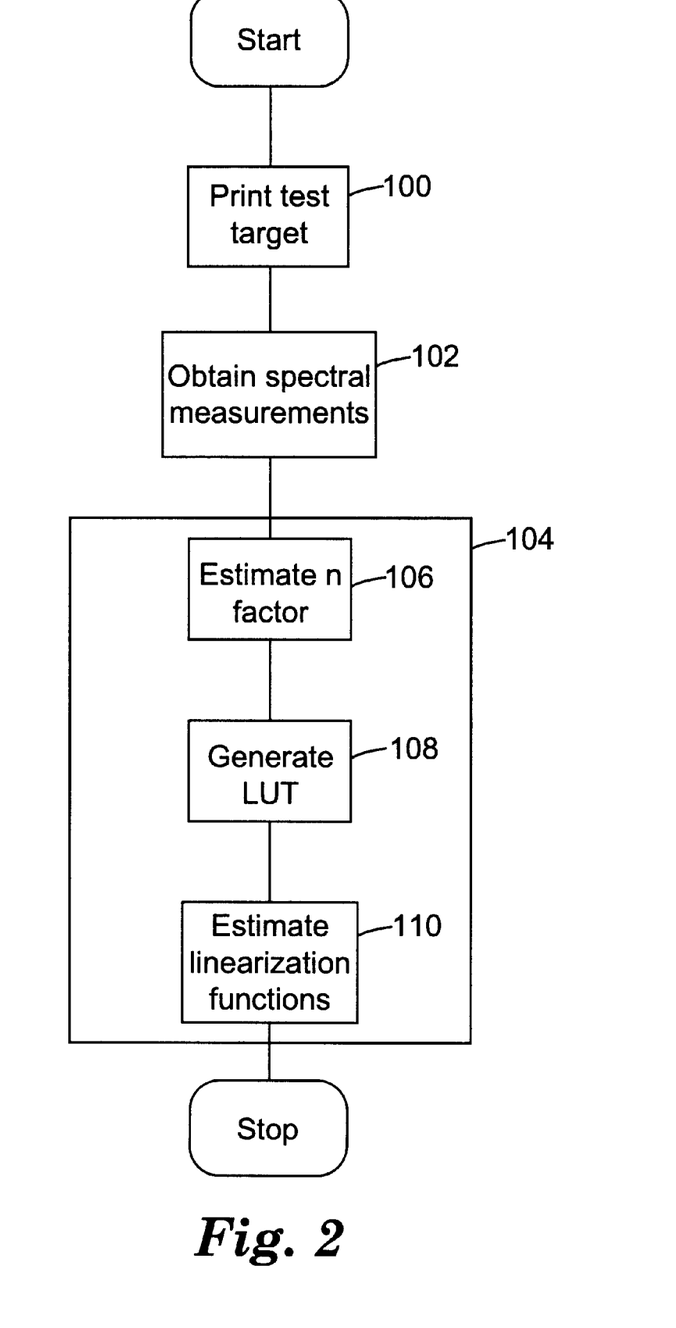
FIG. 2 is a flow chart illustrating an example method that may be used in connection with the system of FIG. 1 for characterizing a halftone printing device, according to one embodiment of the present invention.

According to one embodiment of the present invention, a modeling technique is used to generate a device profile, that characterizes a halftone printer. FIG. 2 is a flow chart illustrating an example process in which the computer arrangement 12 of FIG. 1 is used in a color reproduction process according to this embodiment of the present invention. As depicted at a block 100, the computer arrangement 12 of FIG. 1 causes the display device 10, implemented in this example as a halftone printer, to produce a test target. More specifically, the computer arrangement 12 provides test image data to the display device 10. In response to the test image data, the display device 10 produces a test target, which includes a number of color patches representing the combinations of a small number of color values of each colorant. For a cyan-magenta-yellow-black (CMYK) printer, four values of each colorant (cyan, magenta, yellow, and black) is adequate.

According to a particular embodiment, the patches are selected so that the values for each colorant represent approximately equal steps in dot areas. This selection method reduces the number of patches and spectral measurements used in creating an accurate model of the halftone printer. In certain situations, an alternative selection method is used. For example, smaller steps in dot areas may be used to increase the accuracy of the model in a particular region of the color space. Decreasing the step size in this manner increases the number of patches and spectral measurements used to characterize the printer. Conversely, a larger step size may be used in certain areas of the color space. This alternative selection method decreases the number of patches and spectral measurements used to characterize the printer at the expense of accuracy of the model in a region of the color space. Relatively large step sizes are appropriate in certain areas of the color space in which the calorimetric response varies relatively slowly with changes in digital input values.

After the halftone printer prints the test target, a color-measuring instrument, such as a Gretag SPM-100 spectrophotometer, generates a database of spectral measurements of the test patches. This process is depicted gat a block 102. The spectral measurements database describes the reflectance of the test patches as a function of wavelength within the visible light spectrum.

As depicted generally at a block 104, the computer arrangement 12 then processes the spectral measurements to characterize the colorimetric response of the halftone printer, thus generating the colorimetric model 14 of FIG. 1. In this example embodiment of the present invention, the analytic model 18 of FIG. 1 is implemented as a model, such as the model proposed by Viggiano, that characterizes the spectral reflectance of a sample as a function of wavelength. See J. A. Viggiano, "Modeling the Color of Multi-Colored Halftones," Proc. TAGA 1990, pp. 44–62 (1990). This analytic model uses a spectral form of the Neugebauer equations with a compensating parameter known as the narrowband Yule-Nielsen adjustment parameter or n factor. The n factor accounts for the effect of penetration of light into the paper and is affected by several factors, such as the type of paper used. According to this model, the spectral reflectance of a sample is computed as a function of wavelength using the equation:

$$R'_{sample}9\lambda) = a_c R'_c(\lambda) + a_m R'_m(\lambda) + a_y R'_y(\lambda) +$$

$$a_k R'_k(\lambda) + a_{cm} R'_{cm}(\lambda) + a_{cy} R'_{cy}(\lambda) + a_{ck} R'_{ck}(\lambda) +$$

$$a_{my} R'_{my}(\lambda) + a_{mk} R'_{mk}(\lambda) + a_{yk} R'_{yk}(\lambda) + a_{cmy} R'_{cmy}(\lambda) + a_{cmk} R'_{cmk}(\lambda) + a_{cyk} R'_{cyk}(\lambda) + a_{myk} R'_{myk}(\lambda) +$$

$$a_{cmyk} R'_{cmyk}(\lambda) + a_{paper} R'_{paper}(\lambda)$$

where $R_x(\lambda)$ denotes the spectral reflectance as a function of wavelength $\lambda$, n is the Yule-Nielsen n-factor, u=1/n, $R'_x(\lambda) = [R_x(\lambda)]^u$, and $a_x$ are the relative areas of each Neugebauer primary formed by a particular combination of colorants. As used in this description, the subscript x denotes a combination of colorants. For example, $a_{cm}$ denotes the relative area of the Neugebauer primary formed by overprinting cyan and magenta. The areas $a_x$ are computed using, for example, the DeMichel equations:

$$a_{paper} = (1-c)*(1-m)*(1-y)*(1-k)$$

$$a_c = c*(1-m)*(1-y)*(1--k)$$

$$a_{cm} = c*m*(1-y)*(1-k)$$

$$a_{cmy} = c*m*y*(1-k)$$

$$a_{cmyk} = c*m*y*k$$

etc.

where c, m, y, and k denote estimated dot areas for each colorant. It should be understood that these estimated dot areas are dependent on digital input values. Those skilled in the art will appreciate that the other Neugebauer primary areas $a_x$ are computed in a similar fashion.

To construct the colorimetric model 14 of FIG. 1 in connection with the block 104, the computer arrangement 12 estimates the n factor from the spectral measurements obtained at the block 102. This estimation process is depicted at a block 106. The computer arrangement 12 estimates the n factor using a conventional technique, such as Powell's method, to minimize the average color error over the database of spectral measurements. See W. H. Press et al., "Numerical Recipes in C, 2nd Ed.," Cambridge University Press, 1992, p. 412. For each test value of n as specified by Powell's method, the computer arrangement 12 estimates the $L^*a^*b^*$ coordinates for each color in the database using the analytic model 18. The color differences $\Delta E_{ab}$ between the model-predicted and measured color values are averaged over the entire database. Powell's method monitors the successive average color error values to control the search process and determine the best-fit value of n.

Next, flow proceeds to a block 108, at which the computer arrangement 12 constructs the LUT 16 using any of a variety of conventional search techniques, such as Powell's method. The LUT 16 is used to adjust initial dot area estimates to correct for channel interactions in the halftone printer. The LUT 16 is N-dimensional, where N is the number of colorants. For example, for a CMYK printer, the lookup table has four dimensions. The computer arrangement 12 uses the analytic model 18 with the n factor to determine, for each test patch, the best-fit or "actual" dot areas (c, m, y, k) that minimize the color difference between the measured and predicted values for each color. The computer arrangement 12 searches the valid range of dot areas, e.g., 0 to 1. For example, the computer arrangement 12 may use an unconstrained search method, such as Powell's method, and then constrain the dot areas to the valid range of zero to one using a conventional technique. For an example technique for constraining unconstrained search techniques, reference may be made to R. W. Hamming, "Numerical Methods for Scientists and Engineers," 2d ed., 1973, pp.673–74, incorporated herein by reference. As an alternative, another search technique that can be used to find the best-fit dot areas is the Broyden-Fletcher-Goldfarb-Shanno technique. See W. H. Press et al., "Numerical Recipes in C, 2nd Ed.," Cambridge University Press, 1992, p. 426. The computer arrangement 12 stores the best-fit dot areas as entries in the LUT 16.

The test target provides a subset of the total number of entries in the LUT 16. The computer arrangement 12 obtains the remaining entries in the LUT 16 using, for example, cubic interpolation. Typically, the interpolated values are also constrained to a range of zero to one. Because dot areas vary slowly across the range or gamut of colors that the halftone printer can produce, the computer arrangement 12 can ensure relatively low color error for intermediate values between test patches by measuring test patches that are uniformly spaced in dot area across the gamut. By measuring these test patches, the computer arrangement anchors the predictive error at zero at uniformly spaced points in the LUT 16.

As depicted at a block 110, the computer arrangement 12 optionally estimates the linearization 20, implemented in this example using one dimensional transfer functions, from the spectral measurements. The linearization $c[d_c]$, may be estimated, for example, by determining a functional fit to channel-independent dot area estimates computed using similar techniques as are used for computing the entries to the LUT 16. It should be understood that the linearizations $m[d_m]$, $y[d_y]$, and $k[d_k]$ may be similarly determined. However, in this example embodiment, the n factor provides some compensation for the change in size of dots in a halftone image, known as dot gain, as the image is processed through the various steps in a typical halftone printing process. With the n factor providing some compensation for channel nonlinearity, the linearization 20 is typically only used in extreme cases of channel nonlinearity.

Figure 3:
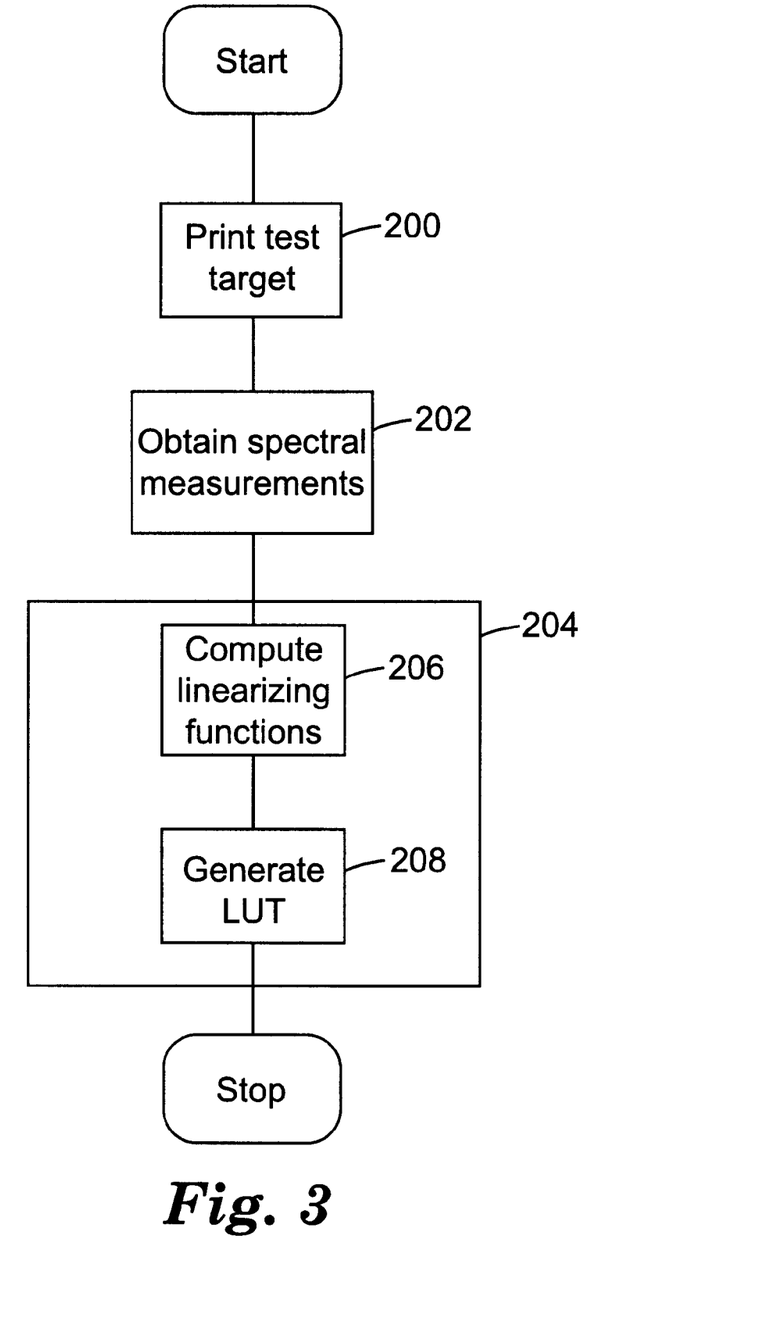
FIG. 3 is a flow chart illustrating an example method that may be used in connection with the system of FIG. 1 for characterizing a dye diffusion device according to another embodiment of the present invention.

In another embodiment of the present invention, the computer arrangement 12 of FIG. 1 is used in connection with an example process illustrated in FIG. 3 to characterize a dye diffusion device. As depicted at a block 200, the computer arrangement (12 of FIG. 1) causes the display device 10, implemented in this example as a dye diffusion device, to produce a pair of test targets by providing test image data to the dye diffusion device.

In response to the test image data, the dye diffusion device produces two test targets. The first test target includes step wedges for each colorant with monotonically increasing color values. The computer arrangement 12 uses the first test target to determine the linearization 20 used in generating indices for indexing the LUT 16. In certain applications in which the dye diffusion device exhibits a reasonably linear relationship between digital value and dye concentration, the linearization 20 is not required. In such applications, the dye diffusion device need not produce the first test target.

The second test target includes a number of color patches representing the combinations of a small number of color values of each colorant. For a typical CMYK dye diffusion device, four values of each colorant (cyan, magenta, yellow, and black) are sufficient. The values for each colorant typically represent approximately equal steps in digital value or dye concentration. Using these values reduces the number of test patches used in creating an accurate model of the dye diffusion device. The colors printed on the second test target may be determined based on measurements of the first test target. Alternatively, a variety of second test targets having differently-colored patches may be printed, and measurements may be obtained from one of the second test targets.

Alternative selection methods may be used in certain application environments. For example, in application environments in which greater accuracy is desired in a particular region of the color space, the test patches may be selected to represent smaller steps in dye concentrations in that region. Decreasing the step size in this manner increases the number of patches, but improves the accuracy of the characterization process. Similarly, in certain regions of the color space in which calorimetric values vary relatively slowly in response to changes in digital input values, it is acceptable to model those regions relatively coarsely. In such applications, the test patches may be selected to represent larger steps in dye concentrations in those regions. Some accuracy may be sacrificed as a result, but the number of test patches used in characterizing the dye diffusion device is reduced.

After the dye diffusion device produces the test targets, flow proceeds to a block 202. At this block, a color-measuring instrument, such as a spectrophotometer, obtains spectral measurements of the test targets. The computer arrangement 12 uses these spectral measurements in subsequent steps to generate the calorimetric model 14 of FIG. 1, as depicted generally at a block 204.

More particularly, in this example embodiment, the analytic model 18 of the calorimetric model 14 is implemented using a dye mixing model, which characterizes the spectral reflectance of a sample as a function of wavelength. One such model, for mixing three dyes, is described in greater detail in R. S. Berns, "Spectral modeling of a dye diffusion thermal transfer printer," Journal of Electronic Imaging, vol. 2, no. 4, October 1993, pp. 359–70, incorporated herein by reference. A version of this model modified for mixing four dyes predicts a reflectance spectrum $R\lambda_{,predicated}$ from a set of dye concentration estimates $c_c$, $c_m$, $c_y$, and $c_k$, given measurements of the reflective spectra of the media and the colorants. According to this model, the spectral reflectance of a sample is computed using the equations:

$$R_{\lambda, predicted} = \frac{(1-k_1)(1-k_2)R_\lambda}{1+k_2 R_\lambda},$$

where $$R\lambda = R\lambda_g \cdot e^{-2K\lambda_{,mix}}$$

In these equations, $R\lambda$ denotes reflectance as a function of wavelength $\lambda$, $k_1$ and $k_2$ are constants, $R\lambda_{,mix}$ is the reflectance of the media alone, and $K\lambda_{,mix}$ is the spectral absorption of the sample under consideration. The sample absorption spectrum is computed as the sum of the absorption of each dye:

$K\lambda,mix = K\lambda,cyan + K\lambda,magenta + K\lambda,yellow + K\lambda,black$ The normalized absorption spectra for varying concentrations of each dye form curves that are nearly coincident. As a result, the absorption of each dye can be computed as a scalar multiple of the absorption of the dye at maximum concentration:

$K\lambda,cyan = CcK\lambda,cyan\_max$
$K\lambda,magenta = CmK\lambda,magenta\_max$
$K\lambda,yellow = CyK\lambda,yellow\_max$
$K\lambda,black = CkK\lambda,black\_max$ The scalars $c_c$, $c_m$, $c_y$, and $c_k$ can be considered to be normalized dye concentrations in a range between zero and one. For digitally-addressed devices, these concentrations are determined as a function of the CMYK digital values $d_c$, $d_m$, $d_y$, and $d_k$.

The computer arrangement 12 uses the first test target to derive the linearization 20 at a block 206. The linearization $c_i[d_i]$ is derived by determining a functional fit to channel-independent concentration estimates computed using, for example, the equation:

$$c_c[d_c] = \frac{\int K_{\lambda,cyan[dc]}d\lambda}{\int K_{\lambda,cyan\_max}d\lambda}$$

It should be understood that $c_m[d_m]$, $c_y[d_y]$, and $c_k[d_k]$ are determined in a similar manner. As addressed above, in certain applications in which the dye diffusion device exhibits a reasonably linear relationship between digital values and dye concentration, the linearization 20 is not necessary.

Next, at a block 208, the computer arrangement 12 generates the LUT 16 of FIG. 1. In this example embodiment, the LUT 16 is used in adjusting initial dye concentration estimates to yield corrected dye concentrations for use in the mixing model. The second test target provides a coarse sampling of the total number of entries in the LUT 16. The computer arrangement 12 obtains the remaining entries in the LUT 16 using, for example, a cubic interpolation technique with interpolated values constrained to the range between zero and one. Assuming that dye concentrations vary slowly over the gamut of the dye diffusion device, the computer arrangement 12 can ensure relatively low color error for intermediate values between test patches by measuring test patches that are uniformly spaced across the gamut. By measuring such test patches, the computer arrangement 12 anchors the predictive error at zero at uniformly spaced points in the LUT 16.

The computer arrangement 12 computes the entries in the LUT 16 using a colorant formulation process. With the previously-measured spectral absorption of the primaries, the computer arrangement 12 determines, using the analytic model 18, the best-fit or "actual" dye concentrations that minimize the color difference between measured and predicted calorimetric values. The colorant formulation process is implemented using a constrained minimization technique to search dye concentration space for the best-fit values in the range between zero and one. The best-fit values are stored as entries in the LUT 16.

Figure 4:
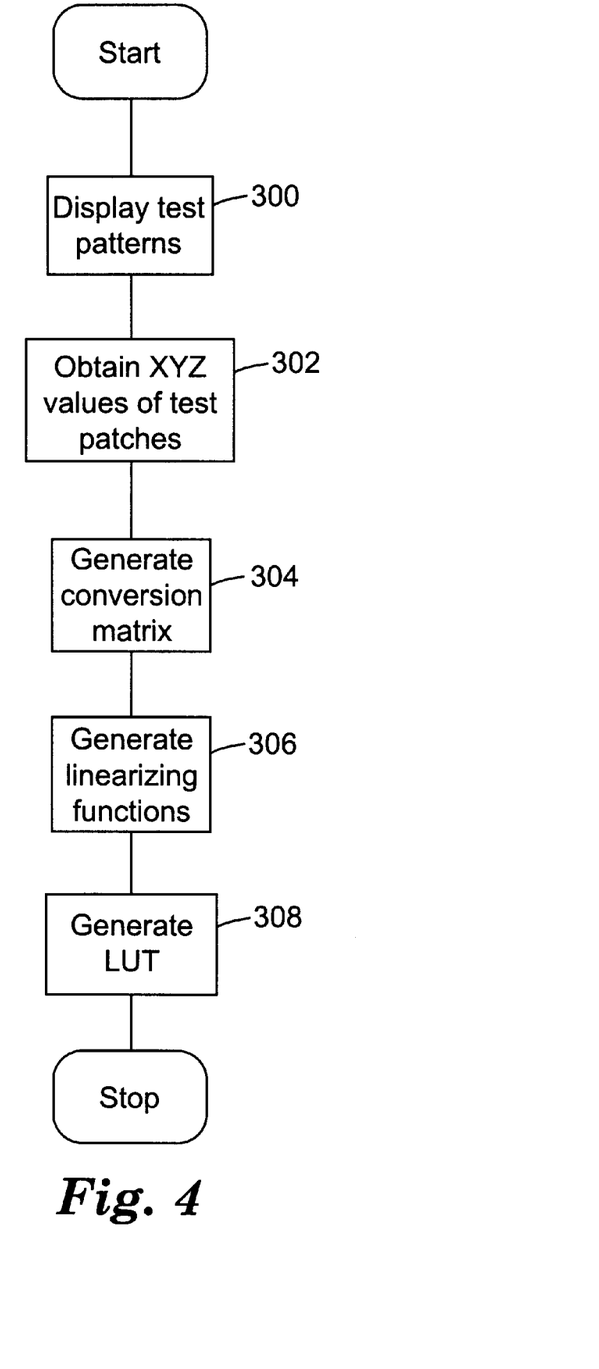
FIG. 4 is a flow chart illustrating an example method that may be used in connection with the system of FIG. 1 for characterizing a CRT according to still another embodiment of the present invention.

According to yet another embodiment of the present invention, the computer arrangement 12 of FIG. 1 is used in connection with an example process illustrated in FIG. 4 to characterize a CRT device. As depicted at a block 300, the computer arrangement 12 of FIG. 1 causes the display device 10, implemented in this embodiment as a CRT, to display two test patterns. More particularly, the computer arrangement 12 provides test image data to the CRT. The CRT subsequently displays two test patterns, each of which includes a number of color patches.

The computer arrangement 12 uses the first test pattern to generate the linearization 20 of FIG. 1 and the analytic model 18 of FIG. 1. In this embodiment, the analytic model 18 is implemented as a conversion matrix that converts color coordinates in an RGB color space to color coordinates in an XYZ color space. The conversion matrix is used, for example, in the following equation:

$$\begin{bmatrix} X \\ Y \\ Z \end{bmatrix} = \begin{bmatrix} X_{r,max} & X_{g,max} & X_{b,max} \\ Y_{r,max} & Y_{g,max} & Y_{b,max} \\ Z_{r,max} & Z_{g,max} & Z_{b,max} \end{bmatrix} \begin{bmatrix} R \\ G \\ B \end{bmatrix}.$$

In the above equation, R, G, and B are device dependent tristimulus values computed from RGB digital values $d_r$, $d_g$, and $d_b$ using the linearization 20. In the illustrated embodiment of FIG. 4, the linearization 20 is implemented using a set of gain-offset-gamma equations:

$$R = R_{max}\left[k_{gain,r}\left(\frac{d_r}{2^N-1}\right) + k_{offset,r}\right]^{y_r}$$

$$G = G_{max}\left[k_{gain,g}\left(\frac{d_g}{2^N-1}\right) + k_{offset,g}\right]^{y_g}$$

$$B = B_{max}\left[k_{gain,b}\left(\frac{d_b}{2^N-1}\right) + k_{offset,b}\right]^{y_b}$$

Where $R_{max}$, $G_{max}$, and $B_{m\ ax}$ the RGB tristimulus values corresponding to the monitor white, i.e., the maximum values of red, green, and blue in combination.

In order to develop the analytic model 18 and linearization 20 of FIG. 1, the computer arrangement 12 first obtains XYZ values of the color patches in the first test pattern using, for example, an X-Rite DPT-92 monitor calorimeter. This process is depicted at a block 302. The first set of color patches consists of a neutral step wedge with RGB digital values that increase monotonically and in equal steps. Next, the computer arrangement 12 generates the conversion matrix, as depicted at a block 304. The computer arrangement 12 uses the XYZ values of the maximum red, green, and blue patches to form the matrix in the analytic model 18. For example, the first column of the conversion matrix consists of the XYZ values of the patch having an R digital value equal to one and G and B digital values equal to zero. The second and third columns of the conversion matrix are similarly generated.

After the computer arrangement 12 generates the conversion matrix, flow proceeds to a block 306. At this block, the computer arrangement 12 uses the conversion matrix and the first test pattern to calculate the linearization 20. First, the computer arrangement 12 computes the inverse of the conversion matrix to obtain an inverse conversion matrix that converts color coordinates in an XYZ color space to color coordinates in an RGB color space. Next, for each of the XYZ values in the neutral step wedge, the computer arrangement 12 computes RGB tristimulus values using the inverse conversion matrix. The computer arrangement 12 then divides each of the R, G, and B values thus computed by the maximum R, G, or B values. In this manner, the computer arrangement 12 obtains normalized RGB tristimulus values for each patch of the step wedge. For each of the red, green, and blue channels, the computer arrangement 12 then performs a functional fit to the normalized RGB tristimulus values to obtain gain, offset, and gamma parameters for use in the gain-offset-gamma equations above.

At a block 308, the computer arrangement 12 uses the second test pattern in determining the entries of the LUT 16 of FIG. 1. The second test pattern includes a set of color patches representing the combinations of a small number of values of each channel. For example, the second test pattern may include five values of each of the three colorants, for a total of 125 color patches. The values for each colorant typically represent approximately equal steps in digital value. The computer arrangement 12 uses a colorant formulation process to compute the entries to the LUT from XYZ measurements of the color patches. Given the linearization 20 and the analytical model 18 of FIG. 1, the computer arrangement 12 uses these components without the LUT 16 to determine, for each color patch, the best fit or "actual" RGB tristimulus values that minimize the color difference between the measured and predicted values. The computer arrangement 12 implements the colorant formulation process using a constrained minimization technique to search RGB tristimulus space for the best fit values. The best fit values are used as the entries in the LUT 16.

The second set of color patches provides a coarse sampling of the total number of entries in the LUT 16. The remaining entries in the LUT 16 are obtained using a cubic interpolation technique. Assuming that RGB tristimulus values vary slowly across the device gamut, the computer arrangement 12 can ensure a low error for values between the coarse samples by reducing or minimizing the predictive error at coarsely spaced points in the LUT 16.

After generating the LUT 16, the computer arrangement 12 optionally stores the LUT 16 in a data file. This data file may be, for example, an image file that also contains image data. The image file optionally also contains the parameters for the model 14 and the color values used in generating the model 14. Storing the color values allows subsequent derivation of an improved model. Alternatively, rather than storing the LUT 16 in the data file, the computer arrangement 12 may store the color data and subsequently generate the LUT 16. Storing the color data instead of the LUT 16 potentially reduces the size of the data file, particularly when the LUT 16 contains many entries.

According to another aspect of the invention, the computer arrangement 12 of FIG. 1 predicts a color from a set of digital values using the model 14 generated, for example, by one of the methods discussed above in connection with FIGS. 1–3. For example, the model 14 can be used to map a set of digital CMYK values to a standard device-independent color space, such as the $L^*a^*b^*$ color space. The color thus predicted may, for example, be displayed on another display device (not shown).

Figure 5:
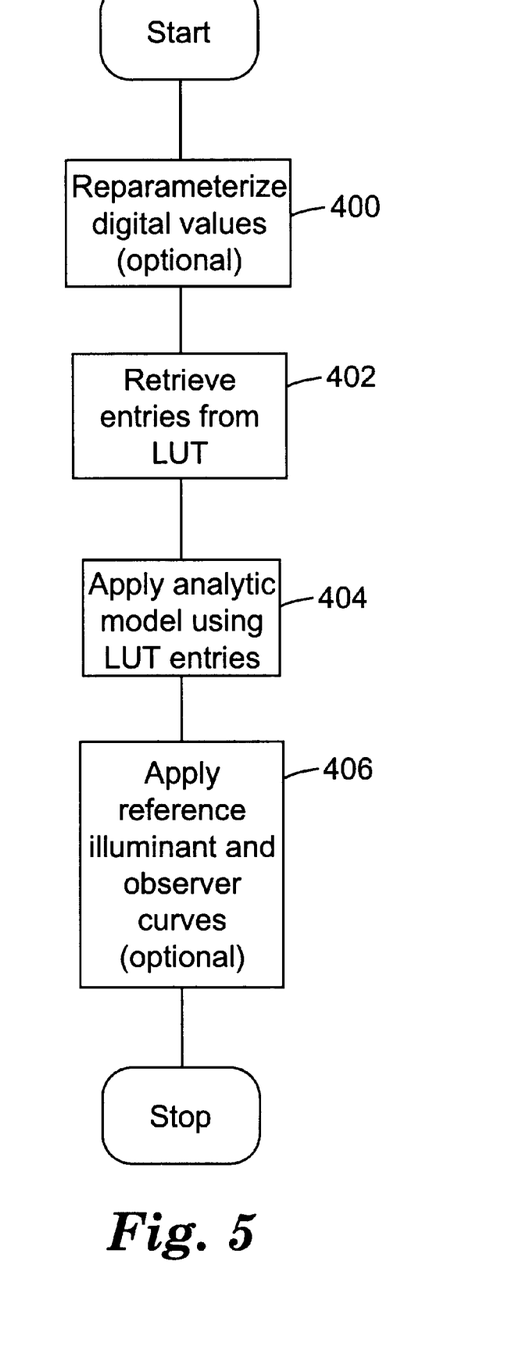
FIG. 5 is a flow chart illustrating an example method that may be used in connection with the system of FIG. 1 for predicting a color from a set of digital values according to another aspect of the present invention.

As shown on the left side of FIG. 1, the model 14 receives a set of digital values that represent a color on the display device 10 at the input 24. For example, assuming the display device 10 is a halftone printer, the digital values are typically digital CMYK values $d_c$, $d_m$, $d_y$, and $d_k$. FIG. 5 illustrates one example method for use in connection with a computer arrangement for predicting the color of a tint from the set of digital values. To map the set of digital values to the standard device-independent color space, the computer arrangement 12 first optionally reparameterizes the set of digital values according to the optional linearization functions 20 to obtain a set of initial values, as depicted at a block 400. For example, if the display device 10 is a halftone printer, these initial values are initial dot area estimates. By contrast, if the display device 10 is a dye diffusion device, the initial values are initial dye concentration estimates. If, on the other hand, the display device 10 is a CRT, the initial values are initial RGB tristimulus estimates. In certain applications, such as many halftone printing processes, the digital values themselves are reasonably linear with respect to the dot areas they produce. The computer arrangement 12 typically does not use the linearization 20 in such applications. Instead, the computer arrangement 12 uses the digital values as the initial values.

Regardless of whether the computer arrangement 12 reparameterizes the digital values, flow proceeds to a block 402, at which the computer arrangement 12 addresses the LUT 16 using the initial values. The computer arrangement 12 thereby retrieves entries from the LUT 16. The LUT corrects for channel interactions in the display device 10 and other systematic behaviors that are not explicitly considered by the analytic model and, when addressed, provides a set of corrected values. For a halftone printer, these corrected values are corrected dot areas. LUTs constructed for dye diffusion models provide corrected dye concentrations. Similarly, LUTs constructed for CRT models produce corrected RGB tristimulus values. The lookup process may use conventional interpolation techniques to compute values between table entries.

Next, as depicted at a block 404, the computer arrangement 12 uses the entries retrieved from the LUT 16 in the block 402 in the analytic model 18 appropriate for the class of devices to which the display device 10 belongs. For example, if the display device 10 is a halftone printer, the computer arrangement 12 uses the entries retrieved from the LUT 16 as the estimated dot areas c, m, y, and k in the DeMichel relations. On the other hand, if the display device 10 is a CRT, the corrected RGB tristimulus values retrieved from the LUT 16 are converted to XYZ tristimulus values using the conversion matrix. By using the entries retrieved from the LUT 16, the computer arrangement 12 obtains a more accurate spectral reflectance or set of XYZ tristimulus values than would be obtained using the initial values.

After the computer arrangement 12 generates the spectral reflectance or XYZ tristimulus values, flow proceeds to a block 406. At this block, the computer arrangement 12 optionally applies standard observer and illuminant curves, e.g., a D50 illuminant curve, to convert the spectral reflectance into XYZ tristimulus values, and, optionally, into another standard color space, such as the $L^*a^*b^*$ color space. Alternatively, using XYZ values of a color and of a white reference, the computer arrangement 12 can convert XYZ values directly to L*a*b* color values. In this manner, the computer arrangement 12 predicts a color based on digital values input to the model 14. This predicted color may then be produced on a second display device, such as a CRT or digital proofing system.

By using the analytic model 18 in conjunction with the LUT 16, the computer arrangement 12 can develop a highly accurate calorimetric model for a display device using a relatively small number of measurements. Furthermore, the model thus obtained obeys a physical display device model. Accordingly, it exhibits smooth variation, fewer irregularities, and less susceptibility to noise in colorimetric measurements.

While the present invention has been described in connection with the example embodiments thereof, it will be understood that many modifications will be readily apparent to those skilled in the art, and this application is intended to cover the embodiments discussed herein and adaptations or variations thereof.

What is claimed is:

1. A system for constructing a display device model that characterizes the calorimetric response of a display device, the system comprising:
    a color measuring instrument configured and arranged to obtain color values from a set of color patches; and
    a computer arrangement configured and arranged to construct the display device model as a function of the color values, the display device model having
    an analytic mixing model constructed as a function of a type of the display device, the analytic mixing model including one or more mathematical equations that define mixing of multiple colors, and
    a multi-dimensional lookup table comprising a set of entries, the lookup table being constructed and arranged to compensate for certain colorimetric characteristics of the display device resulting from interaction of different color channels by receiving a set of indices, providing a set of adjusted values, and applying the adjusted values as inputs to the analytic mixing model.

2. A system according to claim 1, wherein the computer arrangement is further configured and arranged to generate the set of entries of the lookup table using the analytic model to reduce a predictive error between measured color values and corresponding color values predicted by the display device model.

3. A system according to claim 1, wherein the computer arrangement is further configured and arranged to generate a linearization.

4. A system according to claim 1, wherein the computer arrangement is further configured and arranged to store at least one of the following in an image file: parameters for the display device model, the lookup table, and the color values.

5. A system according to claim 1, wherein the analytic model characterizes at least one of the following: a halftone printing device, a dye diffusion device, and a cathode ray tube.

6. A system according to claim 1, wherein the computer arrangement is further configured and arranged to store the color values for subsequent derivation of at least one of the following: the lookup table, and parameters for use in the analytic model.

7. A system according to claim 1, wherein the display device model further comprises a set of transformations for transforming a set of digital colorant values into the set of indices.

8. A system according to claim 7, wherein the set of transformations comprises a set of gain-offset-gamma functions.

9. A method for constructing a display device model that characterizes the colorimetric response of a display device, the method comprising:
    obtaining color values from a set of color patches;
    constructing an analytic mixing model as a function of the color values and a type of the display device, the analytic mixing model including one or more mathematical equations that define mixing of multiple colors; and
    constructing a multi-dimensional lookup table comprising a set of entries as a function of the color values, the lookup table being constructed and arranged to compensate for certain colorimetric characteristics of the display device resulting from interaction of different color channels by receiving a set of indices, providing a set of adjusted values, and applying the adjusted values as inputs to the analytic mixing model.

10. A method according to claim 9, further comprising generating the set of entries of the lookup table using the analytic model to reduce a predictive error between a measured set of color values and a corresponding set of color values predicted by the display device model.

11. A method according to claim 9, further comprising performing at least one mathematical operation on the adjusted values.

12. A method according to claim 9, further comprising storing at least one of the following in an image file: parameters for the display device model, and the color values.

13. A method according to claim 9, wherein the analytic model characterizes at least one of the following: a halftone printing device, a dye diffusion device, and a cathode ray tube.

14. A method according to claim 9, further comprising storing the color values for subsequent derivation of the lookup table.

15. A method according to claim 9, further comprising generating a set of transformations for transforming a set of digital colorant values into the set of indices.

16. A method according to claim 15, wherein the set of transformations comprises a set of gain-offset-gamma transformations.

17. A system for constructing a display device model that characterizes the calorimetric response of a display device, the system comprising:
    means for obtaining color values from a set of color patches;
    means for constructing an analytic mixing model as a function of the color values and a type of the display device, the analytic mixing model including one or more mathematical equations that define mixing of multiple colors; and
    means for constructing a multi-dimensional lookup table comprising a set of entries as a function of the color values, the lookup table being constructed and arranged to compensate for certain colorimetric characteristics of the display device resulting from interaction of different color channels by receiving a set of indices, providing a set of adjusted values, and applying the adjusted values as inputs to the analytic mixing model.

18. For use in a system for constructing a display device model that characterizes the colorimetric response of a display device, a computer arrangement comprising:
    a color measuring instrument configured and arranged to obtain a set of color values from a set of patches and to provide the set of color values to the computer program; and a computer program programmed to construct
an analytic mixing model constructed as a function of a type of the display device, the analytic mixing model including one or more mathematical equations that define mixing of multiple colors, and
a multi-dimensional lookup table comprising a set of entries, the lookup table being constructed and arranged to compensate for certain colorimetric characteristics of the display device resulting from interaction of different color channels by receiving a set of indices, providing a set of adjusted values, and applying the adjusted values as inputs to the analytic mixing model.

19. A computer arrangement according to claim 18, further programmed to generate the set of entries of the lookup table using the analytic model to reduce a predictive error between a measured set of color values and a corresponding set of color values predicted by the display device model.

20. A computer arrangement according to claim 18, further programmed to perform at least one mathematical operation on the adjusted values.

21. A computer arrangement according to claim 18, further programmed to store at least one of the following in an image file: parameters for the display device model, and the color values.

22. A computer arrangement according to claim 18, wherein the analytic model characterizes at least one of the following: a halftone printing device, a dye diffusion device, and a cathode ray tube.

23. A computer arrangement according to claim 18, further programmed to store the color values for subsequent derivation of the lookup table.

24. A computer arrangement according to claim 18, further programmed to generate a set of transformations for transforming a set of digital colorant values into the set of indices.

25. A computer arrangement according to claim 24, wherein the set of transformations comprises a set of gain-offset-gamma transformations.

26. For constructing a display device model that characterizes the calorimetric response of a display device, a data storage medium storing a computer-executable program that, when executed,
obtains color values from a set of color patches;
constructs an analytic mixing model as a function of the color values and of a type of the display device, the analytic mixing model including one or more mathematical equations that define mixing of multiple colors; and
constructs a multi-dimensional lookup table comprising a set of entries as a function of the color values, the lookup table being constructed and arranged to compensate for certain colorimetric characteristics of the display device resulting from interaction of different color channels by receiving a set of indices, providing a set of adjusted values, and applying the adjusted values as inputs to the analytic mixing model.

27. A data storage medium according to claim 26, wherein the computer-executable program, when executed, generates the set of entries of the lookup table using the analytic component to reduce a predictive error between a measured set of color values and a corresponding set of color values predicted by the display device model.

28. A data storage medium according to claim 26, wherein the computer-executable program, when executed, performs at least one mathematical operation on the adjusted values.

29. A data storage medium according to claim 26, wherein the computer-executable program, when executed, at least one of the following in an image file: parameters for the display device model, and the color values.

30. A data storage medium according to claim 26, wherein the analytic model characterizes at least one of the following: a halftone printing device, a dye diffusion device, and a cathode ray tube.

31. A data storage medium according to claim 26, wherein the computer-executable program, when executed, stores the set of color values for subsequent derivation of the lookup table.

32. A data storage medium according to claim 26, wherein the computer-executable program, when executed, generates a set of transformations for transforming a set of digital colorant values into the set of indices.

33. A data storage medium according to claim 32, wherein the set of transformations comprises a set of gain-offset-gamma transformations.

34. A color prediction process for predicting a color from a plurality of inputs, the process comprising:
presenting the inputs to a multi-dimensional lookup table comprising a set of entries, the lookup table being constructed to compensate for certain colorimetric characteristics of a display device resulting from interaction of different color channels;
from the lookup table, retrieving an entry as a function of the inputs;
providing the retrieved entry to an analytic mixing model the analytic mixing model including one or more mathematical equations that define mixing of multiple colors; and
using the analytic mixing model, predicting the color as a function of the retrieved entry.

35. A color prediction process, according to claim 34, further comprising:
transforming the inputs for presentation to the lookup table; and
retrieving the entry from the lookup table as a function of the transformed inputs.

36. A method for characterizing the colorimetric response of an output device, the method comprising:
obtaining color values from color output produced by the output device;
applying an analytic mixing model as a function of the color values and a type of the output device to produce information characterizing the output device, the analytic mixing model including one or more mathematical equations that define mixing of multiple colors by the output device; and
applying a multi-dimensional lookup table to compensate the analytic mixing model for colorimetric characteristics of the output device resulting from interaction of different color channels.

37. The method of claim 36, wherein the output device comprises one of a visual display monitor and a hardcopy printing device.

38. The method of claim 36, wherein the colorimetric characteristics of the output device include calorimetric characteristics of media on which the color output is produced.

* * * * *